Figure 1:
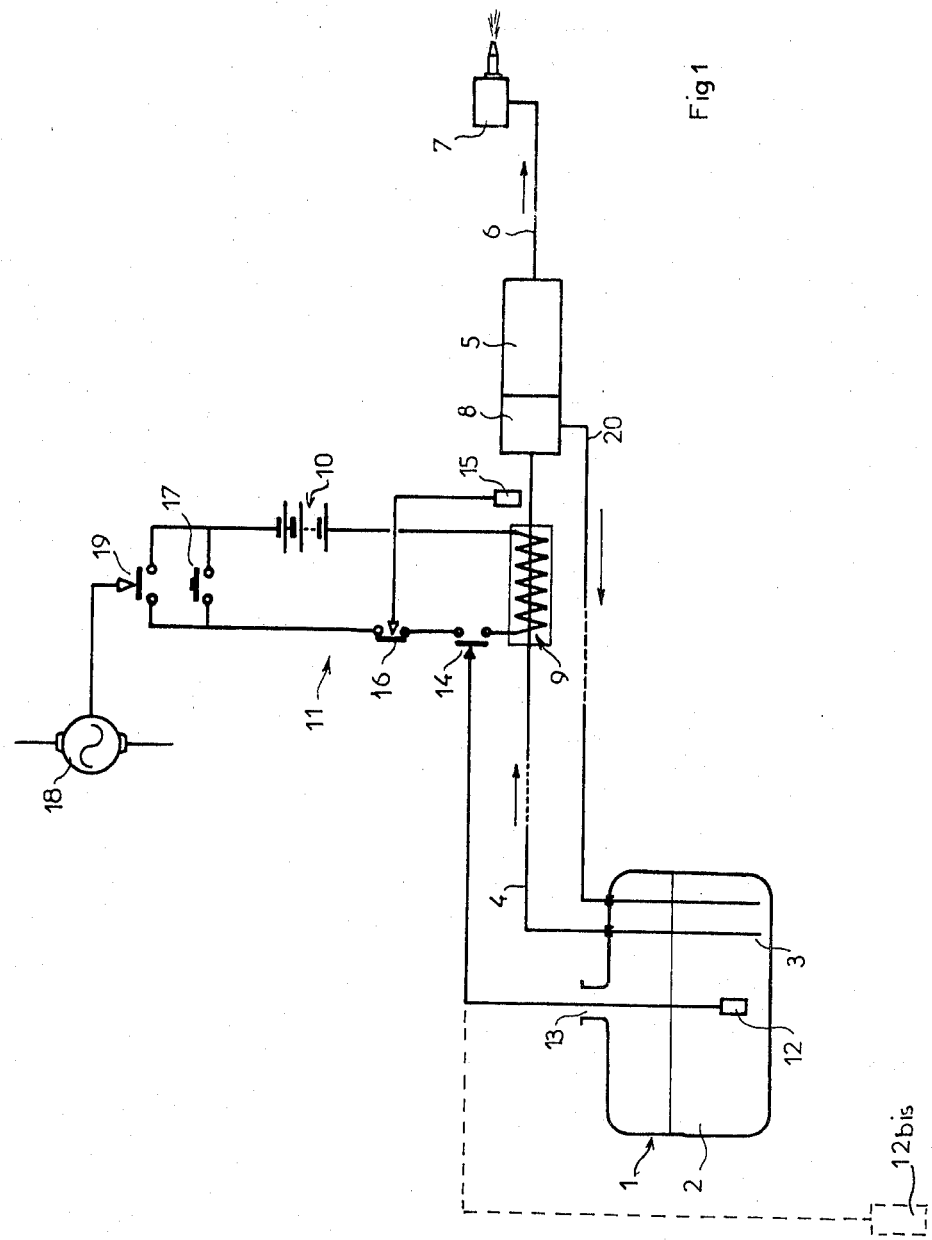

United States Patent [19]

Pierard

[11] 4,397,287
[45] Aug. 9, 1983

[54] METHOD AND APPARATUS FOR LIQUEFYING AND/OR HEATING A FLUID

[76] Inventor: Jocelyn Pierard, Z. I. Villers Semeuse, 08000-Charleville Mezieres, France

[21] Appl. No.: 187,526

[22] Filed: Sep. 15, 1980

[30] Foreign Application Priority Data

Sep. 17, 1979 [FR] France .................... 79 23744

[51] Int. Cl.³ .................................................... F02M 31/00
[52] U.S. Cl. .................................... 123/557; 210/186; 123/552
[58] Field of Search ............... 123/557, 552, 549; 261/142; 219/205; 210/186

[56] References Cited

U.S. PATENT DOCUMENTS

| | | | |
|---|---|---|---|
| 1,237,862 | 8/1917 | Bltliff | 123/557 |
| 2,139,777 | 12/1938 | Skot et al. | 123/549 |
| 2,142,210 | 1/1939 | Rippingille | 123/549 |
| 2,306,984 | 12/1942 | Tolman | 219/205 |
| 3,019,325 | 1/1962 | Clouse | 219/205 |
| 3,354,872 | 11/1967 | Gratzmuller | 123/557 |
| 3,999,525 | 12/1976 | Stumpp | 123/557 |
| 4,003,356 | 1/1977 | Naylor | 123 557/ |
| 4,072,138 | 2/1978 | Hawkins | 123/557 |
| 4,092,963 | 6/1978 | Vrooman | 123/549 |
| 4,146,002 | 3/1979 | Quinn | 123/557 |
| 4,159,698 | 7/1979 | Berenbaum | 123/557 |
| 4,180,036 | 12/1979 | Wolf | 123/557 |
| 4,228,776 | 10/1980 | Gallione | 123/557 |
| 4,259,937 | 4/1981 | Elliot | 123/557 |

Primary Examiner—Ronald H. Lazarus
Attorney, Agent, or Firm—Robert E. Burns; Emmanuel J. Lobato; Bruce L. Adams

[57] ABSTRACT

A method and apparatus for liquefying a liquid fuel in a fuel supply circuit comprising a filter member, is characterized in that the fuel is heated in the circuit immediately upstream of the filter member. The method and apparatus have particular application in liquefying diesel oil before injection or heating a fuel before metering in a diesel engine.

8 Claims, 1 Drawing Figure

METHOD AND APPARATUS FOR LIQUEFYING AND/OR HEATING A FLUID

The present invention relates to a method and apparatus for liquefying and/or heating a fluid and in particular a liquid fuel.

The invention relates in particular to diesel engines and the liquefying of diesel oil before injection, or to the heating of a fuel before metering or measuring its volume.

It is known that certain liquid fuels and in particular certain heavy oils used in this way tend to solidify when the ambient temperature drops below a minimum threshold which is frequently reached in winter.

Thus, for example, the diesel oil used as a fuel for diesel engines solidifies at a temperature of the order of $-4°$ to $-5°$ C., the paraffin, gasoline and other products in which it is rich forming a deposit at this temperature on account of the concentration.

When the engine is running, this deposit accumulates in the filter member protecting the injection pump, until it clogs this filter member and prevents the engine from running correctly.

In order to remedy this drawback, it has been proposed to prevent the formation of such deposits by adding kerosene to the diesel oil, but this solution is effective only if the kerosene is added in a proportion exceeding 40% and this solution hardly seems rational.

It has also been proposed to heat the diesel oil in the tank in which the suction pipe of the injection pump is immersed, in the immediate vicinity of the inlet of this pipe. This solution is not very satisfactory to the extent that fitting a heating element inside the tank causes great difficulties firstly of introducing the latter, then in the positioning of the latter correctly with respect to the inlet pipe at least when one wishes to equip an existing tank with such a heating element.

While such a proposal may lead to the dissolving of the deposit in the tank, it does not prevent the latter from reforming in the line, i.e. between the tank and the filter of the injection pump and consequently from clogging the latter, due to the distance generally separating the tank from the injection pump.

The object of the present invention is to propose a method and apparatus for liquefying liquid fuels which obviates or mitigates these drawbacks.

To this end, the invention proposes to heat the fuel in the circuit immediately upstream of the filter member, taking into account the direction in which the fuel travels through the circuit.

Thus, the deposit possibly formed in the tank dissolves immediately upstream of the region in which it would become troublesome, its presence in the line not being troublesome.

In addition, this arrangement makes it possible to introduce into the injection pump, then to inject into the engine, a heated fuel which burns with greater efficiency and with a saving of fuel. As an example, one could heat the fuel which in the case of diesel oil could be heated to a temperature of the order of 45°-50° C. before being subjected to the heating due to the pump. Thus, at the time of injection, the diesel oil will have a temperature of the order of 70°, which will substantially improve the efficiency of the engine.

Finally, a preferred embodiment of the invention provides for recycling part of the heated fuel back to the tank, which ensures heating of the fuel in the tank and prevents the formation of the deposit after a short running phase.

For liquefying a liquid fuel in a circuit comprising a filter member, the method according to the invention is characterised in that the fuel in the circuit is heated immediately upstream of the filter member.

The apparatus for carrying out this method is in turn characterised in that it comprises a heating element incorporated in the circuit immediately upstream of the filter member.

An embodiment of the present invention will now be described, by way of example, with reference to the single FIGURE which illustrates diagrammatically the circuit for supplying diesel oil to a diesel engine according to the invention.

The reference numeral 1 designates a tank 2 for diesel oil, in which is immersed a pipe 3 connected by a tubular pipe 4 to the inlet of an injection pump 5, the delivery side of which is connected by a pipe 6 to the inlet of an injection nozzle 7.

Under the action of the pump 5, when the engine is running, the diesel oil travels through the circuit defined in the direction indicated by the arrows, travelling from the pipe 3 to the pump 5 along the pipe 4 and from the pump 5 to the injection nozzle 7 along the pipe 6.

Immediately upstream, taking into account this direction fuel flow, i.e. its connection to the pipe 4, the injection pump 5 is provided with a filter member 8 able to prevent the passage of solid particles possibly carried by the diesel oil to the pump 5 and the nozzle 7.

These members are known per se and constitute solely an example of a circuit which is able to implement the invention.

During cold spells, i.e. when the temperature is less than $-4°$ or $-5°$ C. for example (these figures possibly varying depending on the quality of diesel oil used) a deposit is formed in the tank 1 which, sucked through the pipe 3, travels through the pipe 4 and, in the prior art, becomes stationary in the filter 8 which it quickly clogs.

This drawback is prevented according to the invention by heating the diesel oil, in the pipe 4, immediately upstream of the filter member 8 taking into account the direction of flow indicated by the arrows, when due to the ambient temperature conditions there is a danger of the formation of a deposit in the diesel oil inside the tank 1 and along the circuit 4. Thus, the deposit formed in the tank 1 or circuit 4 dissolves immediately before it enters the filter member 8 and consequently the injection pump 5, without any risk of it reforming before reaching the injection nozzle 7, considering the short length of the pipe 6 connecting the injection nozzle 7 to the injection pump 5 and owing to the fact that this pipe 6 like the injection nozzle 7 benefits generally from the heat liberated by the injection pump.

To this end, there is placed around the pipe 4, or inserted between the latter and the filtering member 8, in either case in the immediate vicinity and upstream of the latter, a heating element 9 which is in heat-exchanging contact with the diesel oil at the end of the pipe 4, indirectly through the wall of this pipe, or directly in the pipe.

This heating element may form an integral part of the liquefying device for example by creating in the body of the filter upstream of the filtering member a passage along which the fluid is forced to flow along the heating element.

The heating element 9 may be of any type. When the supply circuit for the engine of a vehicle is equipped according to the invention, it is preferably constituted by an electrical heating resistance supplied with electricity from circuit 11 connected to the terminals of the battery 10 of the vehicle.

Preferably, the operation of the heating element 9 is controlled automatically by temperature probes which are suitably located.

Thus, in the example illustrated, a first temperature probe 12 is immersed in the diesel oil 2 inside the tank 1, to which it is introduced through an orifice specially provided for this purpose or through the orifice 13 for filling the tank as illustrated. This probe 12, of any type known per se, brings about the operation of the heating element 9 when the temperature of the diesel oil inside the tank drops below an upper predetermined threshold at which temperature the deposit begins to form, for example of the order of +5° C., and interrupts the operation of the element 9 as soon as the temperature exceeds this threshold. It will be noted that the temperature probe 12 could also be replaced by a probe 12b having a similar function but advantageously located outside the tank 1 in order to measure the ambient temperature.

In the example illustrated where the heating element 9 is constituted by an electrical resistance, the temperature probe 12 is able to close a contact 14 connected in series in the circuit 11 when the temperature drops below the predetermined threshold and to open this contact when the temperature of the medium in which it is immersed exceeds this threshold.

As a safety measure, in order to prevent heating of the diesel oil above a temperature which would cause its vaporisation, a second temperature probe 15 is also provided, which is interposed between the region of action of the heating element 9 on the diesel oil and the inlet of the filter member 9 in order to allow the operation of the heating element 9 as long as it heats the diesel oil to a temperature lower than the predetermined maximum threshold and to interrupt this operation as soon as the temperature of the diesel oil on leaving the region of action of the heating element 9 exceeds this predetermined threshold. To this end, in the example illustrated, the temperature probe 15 opens a contact 16 connected in series in the circuit 11 when the temperature of the diesel oil on leaving the region of influence of the heating element 9 exceeds the predetermined threshold and closes this contact 16 when it is exposed to a temperature lower than this predetermined threshold.

In the example illustrated, this threshold is for example of the order of 63°-73° C., these figures naturally being able to vary depending on the quality of the diesel oil or more generally of the liquid fuel conveyed through the circuit equipped according to the invention and the admissible expansion on the downstream side.

As a further safety measure, a contact 17 has also been provided in the example illustrated, which contact is located in the circuit 11 in series with the contacts 14 and 16 and is able to be actuated manually for closing or opening the circuit 11. This contact 17 is advantageously controlled by the contact key located on the vehicle dashboard, in order to close when one wishes to start the engine and to open when one wishes to stop the latter. When the engine drives an electric generator such as an alternator 18, a second contact 19 may be provided in parallel with the contact 17, which contact 19 closes when the alternator 18 supplies an electrical current and opens in the opposite case.

Thus, the possibility of operation of the heating element 9 in particular under the action of the temperature probe 12 is limited to the periods of operation of the engine.

It will be noted that frequently and in particular in the example illustrated, the action of the heating element 9 is not limited to the immediate region of the circuit through which the liquid diesel fuel passes, that is the region immediately upstream of the filter member 8.

In particular, in the example illustrated, a branch pipe 20 is provided in the vicinity of the filter 8, which pipe returns to the tank 1 the diesel oil in excess of that which is supplied to the injection nozzle 7 through the pipe 6, the operation of the heating element 9 resulting in progressive heating of the diesel oil inside the tank 1, since the pipe 20 returns heated diesel oil to the latter. This heating of the diesel oil inside the tank slows down or prevents the formation of the deposit. It is naturally preferably in this case to provide a temperature probe 12 located inside the tank 1, rather than outside the latter, in order to act on the heating element 9 according to the temperature of the diesel oil inside the tank 1 and not on the ambient temperature which it progressively exceeds as the heating element 9 operates.

Generally, when one wishes to equip a liquid fuel circuit according to the invention which does not comprise any return line for this fuel from a point downstream of the area to be provided with a heating element such as 9 to a point upstream of this area, it may be advantageous to provide such a return line. In this case, under suitable temperature conditions, the heating element 9 fulfils its liquefying function when the circulation of liquid fuel resumes after an interruption, in order to dissolve the deposit possibly formed during this interruption. Simultaneously, it progressively heats the fuel inside the tank, in order to prevent the formation of deposit. The temperature probe 12 interrupts its operation when the temperature of the fuel in the tank exceeds the predetermined minimum threshold, in order to allow the operation once more if this temperature drops below this minimum threshold.

Apart from the effectiveness of the invention, in particular linked with the fact that it causes the dilution of the deposit immediately upstream of the filter member which it would be able to clog, its great simplicity as regards fitting to an existing circuit should be noted, since it is possible to provide the heating element 9 in a simple form to be inserted between the downstream end of the pipe 4 and the inlet of the filter member 8, or to place the latter around this downstream end of the pipe 4 and the location of temperature probes does not involve drilling, in particular in the region of the tank.

In addition, a day and night warning light makes it possible to warn the driver of the danger of frost, since it is tripped by temperatures outside the vehicle of 0° to +3° C. The probe 12b being used for this purpose.

If this heating element is not sufficient either as regards heating capacity or liquefying capacity, it is thus possible to instal a similar heating element in the supply circuit between the tank and the pump. This arrangement of several heating elements is advantageous particularly if the installation comprises a pre-filter located between the filter and the tank.

For thermal engines, for example in order to optimise the efficiency of the apparatus in its double function of liquefying and economising on fuel, it will be possible to connect the probes and thermocontacts to a microprocessor which will take into account the following parameters:
(A) Temperature of the outer air,
(B) Temperature of the fuel at the inlet of the apparatus,
(C) Temperature of the exhaust gas,
(D) Maximum heating temperature of the fuel.

The microprocessor indicates the quantity of Amperes to be supplied to the heating elements taking into account the output of the engine and of the accessories.

What is claimed is:

1. In a fuel system for diesel internal combustion engine of a vehicle having a storage battery and an alternator supplying current to said battery, said system comprising fuel injection nozzles, pump means for supplying liquid fuel under pressure to said injection nozzles, fuel filter means immediately upstream of said pump means for filtering fuel supplied to said pump means, a fuel tank and a fuel line connecting said fuel tank with said filter means, the improvement comprising an electric heating element for heating fuel in said fuel line immediately upstream of said filter means to a temperature below the vaporization point to avoid filter-clogging deposits in said filter means, means for sensing the the temperature of fuel in said fuel tank, and an electric circuit supplying current from said alternator and battery to said heating element, said circuit including first switch means controlled by said temperature sensing means and second switch means connected in series with said first switch means and controlled by contact means controlling operation of the engine means to supply electricity to the electric heating element to heat the fuel only when said engine is in operation and when the temperature of fuel in said fuel tank is below a predetermined value.

2. A fuel system according to claim 1, in which said temperature sensing means comprises a probe in said fuel tank for sensing the temperature of fuel in said tank.

3. A fuel system according to claim 1, in which said temperature sensing means comprises a probe in the vicinity of said fuel tank for sensing ambient temperature to which said fuel tank is subjected.

4. A fuel system according to claim 1, in which second temperature sensing means senses the temperature of the fuel between said heating means and said filter and controls said heating means to turn off said heating means when the temperature of the fuel downstream of said heating means exceeds a predetermined value.

5. A fuel system according to claim 1, in which third switch means connected in parallel with said second switch means is controlled by said alternator to be closed only when said alternator is producing a voltage.

6. A fuel system according to claim 1, in which said temperature sensing means has a maximum threshold of between 45° C. and 50° C.

7. A fuel system according to claim 1, in which a return line is connected between said fuel line downstream of said heating means and said fuel tank to return a portion of heated fuel to said fuel tank.

8. In a fuel system for a diesel internal combustion engine of a vehicle having a storage battery and an alternator supplying current to said battery, said system comprising fuel injection nozzles, pump means for supplying liquid fuel under pressure to said injection nozzles, fuel filter means upstream of said pump means for filtering fuel supplied to said pump means, a fuel tank and a fuel line connecting said fuel tank with said filter means, the improvement comprising an electric heating element for heating fuel in said fuel line immediately upstream of said filter means to a temperature below the vaporization point to avoid filter-clogging deposits in said filter means, means for sensing the temperature of fuel in said fuel tank, and an electric circuit supplying current from said battery and alternator to said heating element, said circuit including first switch means controlled by said temperature sensing means, manually controllable second switch means connected in series with said first switch means and third switch means connected in parallel with second switch means and controlled by said alternator to be closed when said alternator is producing voltage to supply current to said electric heating element to heat the fuel only when the temperature of fuel in said fuel tank is below a predetermined value and at least one of said second switch means and third switch means is closed.

* * * * *